Sept. 18, 1956 G. E. PIHL 2,763,830

BROAD BAND SECONDARY PHASE STANDARD

Filed Feb. 18, 1955

4 Sheets-Sheet 1

Inventor
George E. Pihl
Alois W. Graf
Attorney

Sept. 18, 1956 G. E. PIHL 2,763,830

BROAD BAND SECONDARY PHASE STANDARD

Filed Feb. 18, 1955 4 Sheets-Sheet 2

Inventor
George E. Pihl
Alois W. Graf
Attorney

Sept. 18, 1956 G. E. PIHL 2,763,830

BROAD BAND SECONDARY PHASE STANDARD

Filed Feb. 18, 1955 4 Sheets-Sheet 3

Inventor
George E. Pihl
Alois W. Graf
Attorney

Sept. 18, 1956 G. E. PIHL 2,763,830

BROAD BAND SECONDARY PHASE STANDARD

Filed Feb. 18, 1955 4 Sheets-Sheet 4

Inventor
George E. Pihl
Alois W. Graf
Attorney

United States Patent Office 2,763,830

Patented Sept. 18, 1956

2,763,830

BROAD BAND SECONDARY PHASE STANDARD

George E. Pihl, Abington, Mass., assignor to Acton Laboratories, Inc., Acton, Mass.

Application February 18, 1955, Serial No. 489,239

13 Claims. (Cl. 323—121)

This invention relates to a broad band secondary phase standard, and more particularly to such a standard which supplies a pair of output voltages having a precisely known phase relationship variable over a 360° range.

It is an object of this invention to provide a new and improved broad band secondary phase standard; i. e. capable of operating over a wide frequency range.

Another object of this invention is to provide an improved broad band secondary phase standard having a pair of output voltages whose phase relationship may be varied smoothly over a 360° range by means of a single control dial.

Another object of this invention is to provide an improved phase standard having a linearly calibrated phase control dial.

Another object of this invention is to provide an improved phase standard having two output voltages of precisely known phase relationship which are approximately equal in amplitude to a selected reference oscillator voltage and to each other.

Another object of this invention is to provide an improved phase standard having a minimum number of operating controls.

A further object of this invention is to provide an improved phase standard having good inherent stability characteristics.

A further object of this invention is to provide an improved phase standard having a high degree of accuracy.

A still further object of this invention is to provide an improved phase standard having a low output voltage variation as the phase relationship of the output voltage is varied over the range of the standard.

An additional object of this invention is to provide an improved phase standard having a low inherent harmonic distortion.

Other objects and advantages of the invention will be apparent during the course of the following description when read in connection with the accompanying drawings, wherein.

Figure 2:
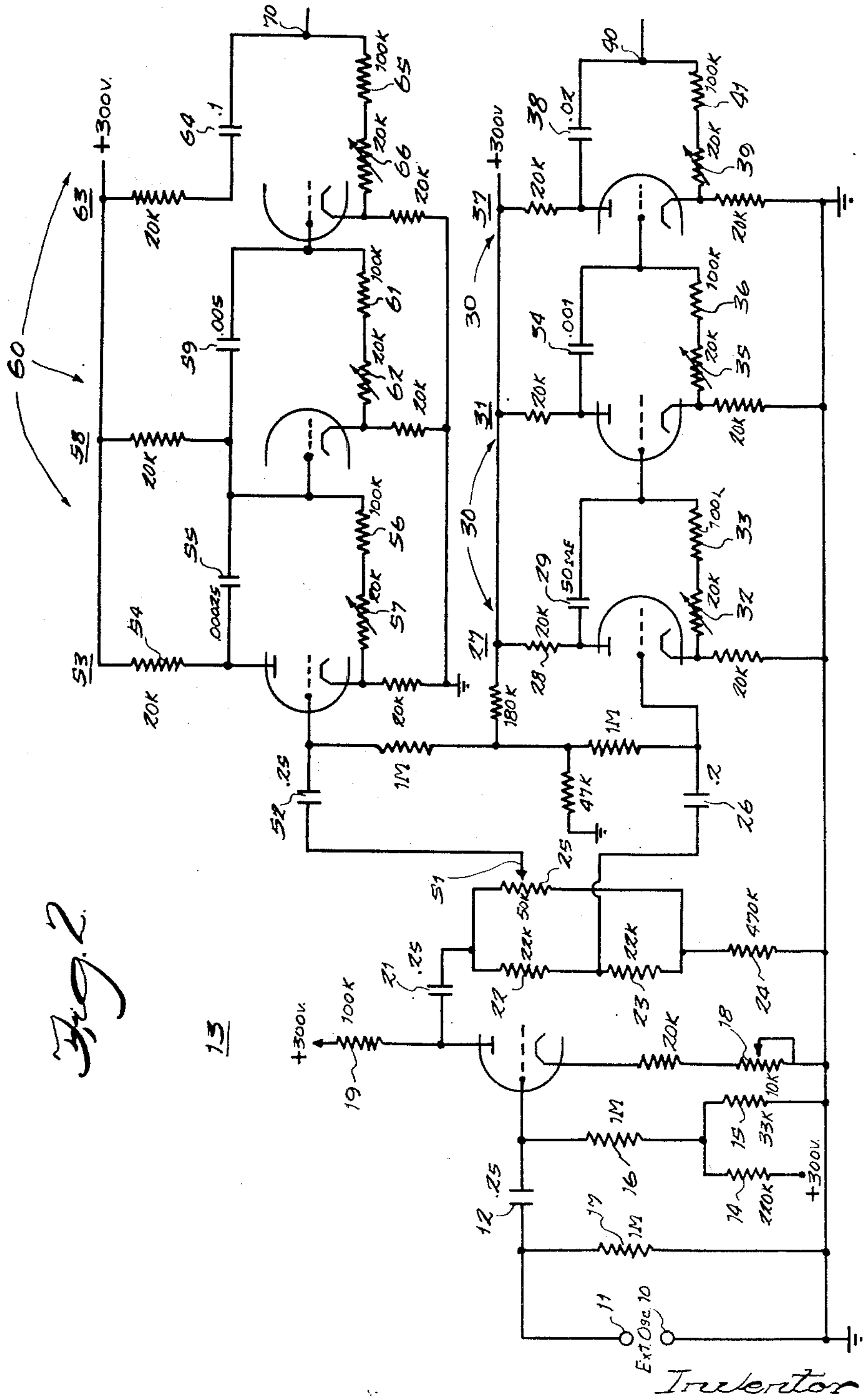
Figure 2 is a schematic wiring diagram of the portion of the broad band phase standard closest to the external oscillator input.

Referring now more particularly to Figure 2 of the drawing, an external oscillator having a frequency output desired as the frequency of the phase related voltages at the output of the phase standard, is connected to terminals 10 and 11. The external oscillator input appearing at terminal 11 is coupled through a capacitor 12 to the grid of an amplifier stage 13. Amplifier 13 has its grid biased to a small positive voltage by connecting the common connection of a voltage divider consisting of two resistors 14 and 15 between B+ and ground, through a resistor 16, to the grid of the amplifier 13. Since a somewhat larger positive voltage appears on the cathode of amplifier 13, the net tube bias is negative. A resistor 17 across the input of the external oscillator terminals 10 and 11 serves impedance termination purposes and insures that no direct voltage will appear on terminal 11 due to leakage of capacitor 12. A potentiometer 18 in the cathode circuit of the amplifier 13 is used to adjust the gain of the amplifier 13. It is an internal adjustment which need not be made except at infrequent intervals when, due to tube aging or the like, the amplification factor of the overall system has changed considerably.

The output of the amplifier stage 13 is taken from across the plate load resistor 19, through a capacitor 21, and applied to a resistance voltage divider chain consisting of three series connected resistors 22, 23 and 24. A potentiometer 25 is connected across resistors 22 and 23. The first output is taken from the junction of the resistors 22 and 23 through a capacitor 26 to the grid of a first tube stage of a three stage phase shift network 30. Stage 27 has a plate load resistor 28, the voltage across which is applied to a series circuit between the plate and ground, consisting of a capacitor 29, two resistors 32 and 33, and the stage 27 cathode resistor. The common connection between capacitor 29 and resistor 33 is connected to the grid of a stage 31 which is the second stage of the three stage phase shift network. It should be noted that the cathode resistor of the stage 27, being unby-passed, will have developed across it a voltage due to the current flow through the tube of the stage which is, in effect, also coupled (through resistors 32 and 33) to the grid of the stage 31. The capacitor 29 cooperates with the two series connected resistors 32 and 33 to provide a portion of the total phase shift desired in the phase shift network. The resistor 32 is an adjustable resistor permitting an adjustment of the phase shift obtained in the stage 27. It should be noted that a small positive voltage is applied to the grid of the stage 27 through a resistance voltage divider between B+ and ground, though an overall negative stage bias is maintained in the same manner as described in connection with the bias arrangement for the amplifier stage 13. For a detailed explanation as to the principle involved in obtaining a phase shift through a series connection of a capacitor and a resistor, connected between the plate and the cathode of a tube stage, reference is had to Section 44 of the Massachusetts Institute of Technology Radiation Laboratory Series, volume 19, on Wave Forms, published by the McGraw-Hill Book Company, Inc. This section, covering phase shift oscillators, noting, for example Figure 412, explains and utilizes such phase shifting devices.

The stage 31 utilizes a capacitor 34 and two resistors 35 and 36, connected in series between the plate and the cathode of the stage, to obtain the desired phase shift at the junction point between the resistors and the capacitor, in the same manner as the phase shift obtained in the stage 27. The common connection between the capacitor 34 and the resistor 36 is connected to the grid of a third phase shift stage 37, which stage provides a phase shift in a capacitor-resistor network consisting of a capacitor 38 and two resistors 39 and 41, in the same manner as is done in the phase shift stage 27. Adding the phase shifts obtained in each of the individual phase shift stages 27, 31 and 37, we obtain the total phase shift provided by the phase shift network 30.

The phase shifted output of the stage 37 is connected through a conductor 40 to the grid of a buffer tube stage 42. The output of the stage 42 is taken across a cathode resistor 43 in the cathode circuit of this stage and fed through a capacitor 44 to the grid of a cathode follower stage 45. Under no-signal conditions, the grid of the cathode follower stage 45 is maintained at a small positive voltage through a resistance voltage divider chain, while the overall stage bias is negative in the same manner as the biasing arrangement for the amplifier stage 13. The output of the cathode follower stage 45 is taken across a cathode resistor 46 and applied to a summing resistor 47 and a summing resistor 48.

A second output is taken from the voltage divider chain across the output of the amplifier 13, previously described, by the movable arm 51 of the potentiometer 25. The voltage appearing on the movable arm 51 is couped through a capacitor 52 to the grid of a first tube stage 53 of a three stage phase shift network 60. The grid of the tube stage 53 is held, under no-signal conditions, at a small positive voltage by a resistance voltage divider, though the overall grid-to-cathode voltage is negative, in the same manner as the grid of the amplifier stage 13. The output of the stage 53 is taken across the plate load resistor 54 and phase shifted through a capacitor 55 and two series connected resistors 56 and 57, in the same manner as described in connection with the phase shifting network between the plate and the cathode of the stage 27. The phase shifted output of the stage 53 taken from the common connection of the capacitor 55 and the resistor 56 is applied to a second phase shift stage 58. A phase shift network consisting of a capacitor 59, a fixed resistor 61 and a variable resistor 62 between the plate and the cathode of the stage 58, provides a phase shift in the same manner as explained in connection with the stage 27. The phase shifted output appearing at the common connection between the capacitor 59 and the resistor 61 is applied to a third phase shift stage 63, having a phase shift network consisting of a capacitor 64, a fixed resistor 65 and a variable resistor 66, connected between the plate and the cathode of this stage. The phase shifted output of this stage, appearing at the common connection 70 between the capacitor 64 and the resistor 65, has a phase shift which is the sum of the individual phase shifts produced by each of the three phase shift stages 53, 58 and 63.

The phase shifted output of the stage 63 is applied to the grid of a phase-splitting inverter stage 67, having a cathode resistor 68 and a plate load resistor 69. One output is taken from across the plate load resistor 69 through a capacitor 71 to the grid of one section 72 of a cathode follower stage 73. A second output from the inverter stage 67 is taken across the cathode resistor 68 through a capacitor 74 to the grid of the other section 75 of the cathode follower stage 73. The grids of the left and right sections 75 and 72, of the cathode follower stage 73, under no-signal conditions, are fixed at a small positive voltage, though an overall negative stage bias exists by a resistance voltage divider in the same manner as the grid of the amplifier stage 13. The output from the cathode follower section 72 is taken across a cathode resistor 76 and applied to a summing resistor 77. The output from the cathode follower section 75 is taken across a cathode resistor 78 and applied to a summing resistor 79. The summing resistors 77 and 48 are connected in well known manner to sum the voltages appearing across the cathode resistors 76 and 46, and provide a sum output on the common connection 81. Summing resistors 79 and 47 are connected to sum the voltages appearing across cathode resistors 78 and 46, and provide a sum output of the voltages appearing across these cathode resistors on the common connection 82.

The voltage appearing on the conductor 81 is applied to the grid of an attenuator stage 83, having a potentiometer 84 in its cathode circuit. The output from the attenuator stage 83 is taken from the arm 85 of the potentiometer 84 and applied through a capacitor 86 to the grid of the left hand section 87 of a phase-splitting inverter stage 88. The grid of the left hand section 87 is biased at a small positive potential by a voltage taken from a resistance voltage divider, though the overall stage bias (grid-to-cathode) is negative, similar to that used to bias the grid of the amplifier stage 13.

The outputs of the left hand section 87 of the phase splitting inverter stage 88 are taken across a plate load resistor 89 and a cathode resistor 91 and applied through capacitors 92 and 93, respectively, to the grids of sections 95 and 96, respectively, of a dual cathode follower stage 94. The output from section 95 is taken across a cathode resistor 97, while the output from section 96 is taken across a cathode resistor 98. The grids of the cathode follower stage sections 95 and 96 are held under no-signal conditions at a small positive potential, though the overall stage bias is negative, obtained from a resistance voltage divider similar to that used to bias the grid of the amplifier stage 13.

The voltage appearing at the common summing resistor connection 82, is applied to the grid of an attenuator stage 99 having a potentiometer 101 in its cathode circuit. The output from the attenuator stage 99 is taken from a variable arm 102 of the potentiometer 101 and applied through a capacitor 103 to the grid of the right hand section 104 of the phase-splitting inverter stage 88. The arm 85 of the potentiometer 84 and the arm 102 of the potentiometer 101 are conneced to move together by a mechanical coupling member 90. The grid of the right hand section 104 of the phase splitting inverter stage 88 is maintained, under no-signal conditions, at a slightly positive potential in the same manner as described in connection with the biasing of the grid of the amplifier stage 13. It should be noted that the overall stage bias remains negative. The outputs of the right hand section 104 are taken across a plate load resistor 105 and a cathode resistor 106 and applied through capacitors 107 and 108, respectively, to the grids of a left hand section 109 and a right hand section 111, respectively, of a dual cathode follower stage 112. The grids of the two sections of the cathode follower stage 112 are biased at a small positive potential, with an overall negative stage bias, in the same manner as the biasing arrangement for the amplifier stage 13.

The output of the left hand section 109 of the cathode follower stage 112 is taken across a cathode resistor 113 and carried through a lead 114 and a lead 115 to the 180° tap of a one-turn 100 K ohm potentiometer 116 having taps 90° apart at the 0°, 90°, 180° and 270° angular positions. The potentiometer 116 has its wiper arm 117 mechanically coupled to rotate with a wiper arm 118 of a four-section commutator assembly 119 by a coupling member 120.

The four-section commutator assembly 119 has four sections positioned as segments of a circle, each occupying a little less than 90° of arc. The sections are electrically insulated from each other and arranged so that the wiper arm 118 will sequentially contact each of the four sections. Two series connected resistors 121 and 122 are connected between sections 123 and 124 of the assembly 119. Two series connected resistors 125 and 126 are connected between sections 123 and 127 of the assembly 119. Another two series connected resistors 128 and 129 are connected between the sections 127 and 131 of the assembly 119, and a further two series connected resistors 132 and 133 are connected between the sections 131 and 124 of the assembly 119.

A wiper arm 134 of a 20 K one-turn potentiometer 135, having two taps 136 and 137 an angular distance of 180° apart, is geared to rotate at a 4:1 speed ratio with the wiper arm 118 of assembly 119. A resistor 130 is connected between the tap 137 of the potentiometer 135 and one side of a capacitor 140 whose other side is connected to ground.

The output across cathode resistor 113 is also applied through the lead 114, a lead 138 and a lead 139 to the common connection between the resistors 128 and 129. The output of the right hand section 111 of the cathode follower stage 112 is taken across a cathode resistor 141 and applied through a lead 142 and 143 to the 0° tap of the one-turn potentiometer 116 and the common connection between the series connected resistors 121 and 122. The voltage appearing across cathode resistor 97 of section 95 of cathode follower stage 94 is applied through a lead 144 and a lead 145 to the 90° tap of the one-turn potentiometer 116. This voltage is also applied through the lead 144 and a lead 146 to the common connection between the series connected resistors 132 and 133.

The voltage appearing across the cathode resistor 98 of the section 96 is applied through a lead 147 to the 270° tap of the one-turn potentiometer 116 and through the lead 147 and 148 to the common connection between the series connected resistors 125 and 126. Thus, the voltages applied to the four tap points of the potentiometer 116 have a phase relationship of 90°, 180° and 270°, with respect to the reference phase applied to the fourth tap point, which is arbitrarily taken as 0°, and are applied in a sequential manner to the taps of the potentiometer. The same phase sequence exists between the voltages applied at the juncture of the resistor pairs 121—122, 133—132, 129—128, and 126—125. The signal output picked up by the wiper arms 117 and 118 are combined by having these wipers connected by a conductor 149. The voltage appearing on the conductor 149 as a result of the rotation of the two wiper arms 117 and 118 varies linearly in phase with the rotation of wiper arms 117 and 118, but has also an amplitude variation with the phase variation. Wiper arms 117, 118 and 134 are rotated by turning a dial knob **120*a* which is connected to the coupling member 120. The dial (not shown) cooperating with the dial knob 120*a*** is calibrated in angular units, such as degrees.

The phase variable voltage appearing on lead 149 is applied to the grid of a cathode follower stage 181. The output of the cathode follower stage is taken across a cathode resistor 182 and applied to the common connection between two resistors 183 and 184. The other end of the resistor 183 is connected to the tap 136 of the potentiometer 135. The wiper arm 134 of the potentiometer 135 is connected through a lead 185 to the side of the resistor 184 not common to the resistors 183 and 184. The potentiometer 135 connected in the cathode circuit of the cathode follower stage 181 serves to compensate for the amplitude variation of the phase variable signal, so as to provide a constant amplitude, phase variable signal at the grid input to amplifier stage 188.

For further details as to the theory and operation of the phase shifter and amplitude compensation circuit used in this invention, reference is had to the co-pending application of George E. Pihl, Serial No. 483,307, filed January 21, 1955 for Electric Phase Shifting Device.

To assure linearity of phase variation with rotation of the wiper arms, it is necessary to make the four phase displaced voltages equal in magnitude. This is accomplished by means of the variable attenuator stages 83 and 99, and more particularly, the potentiometers 84 and 101 in their respective cathode circuits.

The potentiometers 84 and 101 are adjusted by observing a metering circuit which will now be described. The alternating voltage appearing across the cathode resistor 113 is applied through the lead 114 and a capacitor 151, to the plate of a shunt rectifier diode 152. The rectified voltage is applied through a resistor 153 to the grid of one section 154 of a balanced metering stage 155. The alternating voltage appearing across the cathode resistor 97 of the section 95 of the cathode follower stage 94 is applied through the lead 144, a lead 156, and a capacitor 157 to the plate of a shunt rectifier diode tube 158. The rectified voltage is applied through the resistor 159 to the grid of the other section 161 of the balanced metering stage 155. The balanced metering stage 155 has its grids returned through respective resistors 162 and 163 to the two ends of a potentiometer 164. The cathode of the rectifier tube 152 is connected through a lead 168 to the juncture between one of the winding ends of the potentiometer 164 and the resistor 162. The cathode of the rectifier tube 158 is connected through a lead 169 to the juncture between the other winding end of the potentiometer 164 and the resistor 163. The grids of tubes 154 and 161 are polarized positively with respect to ground by means of a voltage divider between B+ and ground consisting of the two resistors 165 and 166. Connection is made by means of conductor 167 from the junction of resistors 166 and 165 to the wiper arm 167 of potentiometer 164. Sufficient positive voltage appears on the cathodes of 154 and 161 so that the net grid biases are negative. A filter or bypass capacitor 171 is connected between the grid and ground of the left hand section 154 of the balanced metering stage 155, while a similar capacitor 172 is connected between the grid and ground of the right hand section 162 of the balanced metering stage 155. A resistor 173 is connected between the cathode of the metering stage section 154 and one end of a potentiometer 174. A resistor 175 is connected between the cathode of the metering stage section 161 and the other end of the potentiometer 174. The movable arm of the potentiometer 174 is connected through a resistor 176 to ground. A resistor 177 is connected between the cathode of the metering stage section 154 and one connection of a D. C. microammeter 178, which is of the zero-center type. The other connection of the D. C. microammeter 178 is connected to the cathode of the metering stage section 161.

With no signal applied, the metering stage 155 is adjusted for zero indication of the meter 178 by means of the movable arm of potentiometer 174. With equal signals applied to the plates of the rectifier tubes 152 and 158, the metering stage 155 is adjusted for zero indication of the meter 178 by means of the movable arm of potentiometer 167. This process is repeated to insure coincidence of both zeros.

The wiper arm 134 of the potentiometer 136 is also connected through a conductor 186 and a capacitor 187 to the grid of an amplifier stage 188. The grid of the amplifier stage 188 is biased at a small positive potential in the same manner as the grid of the amplifier stage 13. A variable resistor 190 is connected in the cathode circuit of the stage. The output of the amplifier stage 188 is taken across a load resistor 189 through a lead 191 and a capacitor 192 to the grid of a cathode follower stage 193. The grid of the cathode follower stage 193 is biased at a small positive potential, though the overall stage bias is negative, similar to the manner of biasing the grid of the amplifier stage 13. The output of cathode follower stage 193 is taken across a cathode resistor 194 and applied through a capacitor 195 to one side of a resistor 196 and a terminal 197. The terminal 197 provides the variable phase output voltage of the broad band phase standard of this invention.

The voltage appearing across cathode resistor 113 is applied through the lead 114, lead 138 and a lead 198 to the grid of a cathode follower stage 199. The output voltage of the cathode follower stage 199 is taken across a cathode resistor 201 and applied through a capacitor 202 to one side of a resistor 203 and a terminal 204. The terminal 204 provides the reference phase output voltage of the broad band phase standard. The variable resistor 190 in the cathode circuit of the amplifier stage 188 is adjusted to vary the gain of the amplifier stage 188 to make the variable phase output voltage appearing at the terminal 197 equal in amplitude to the reference phase output voltage appearing at the terminal 204.

Figures 1, 5:
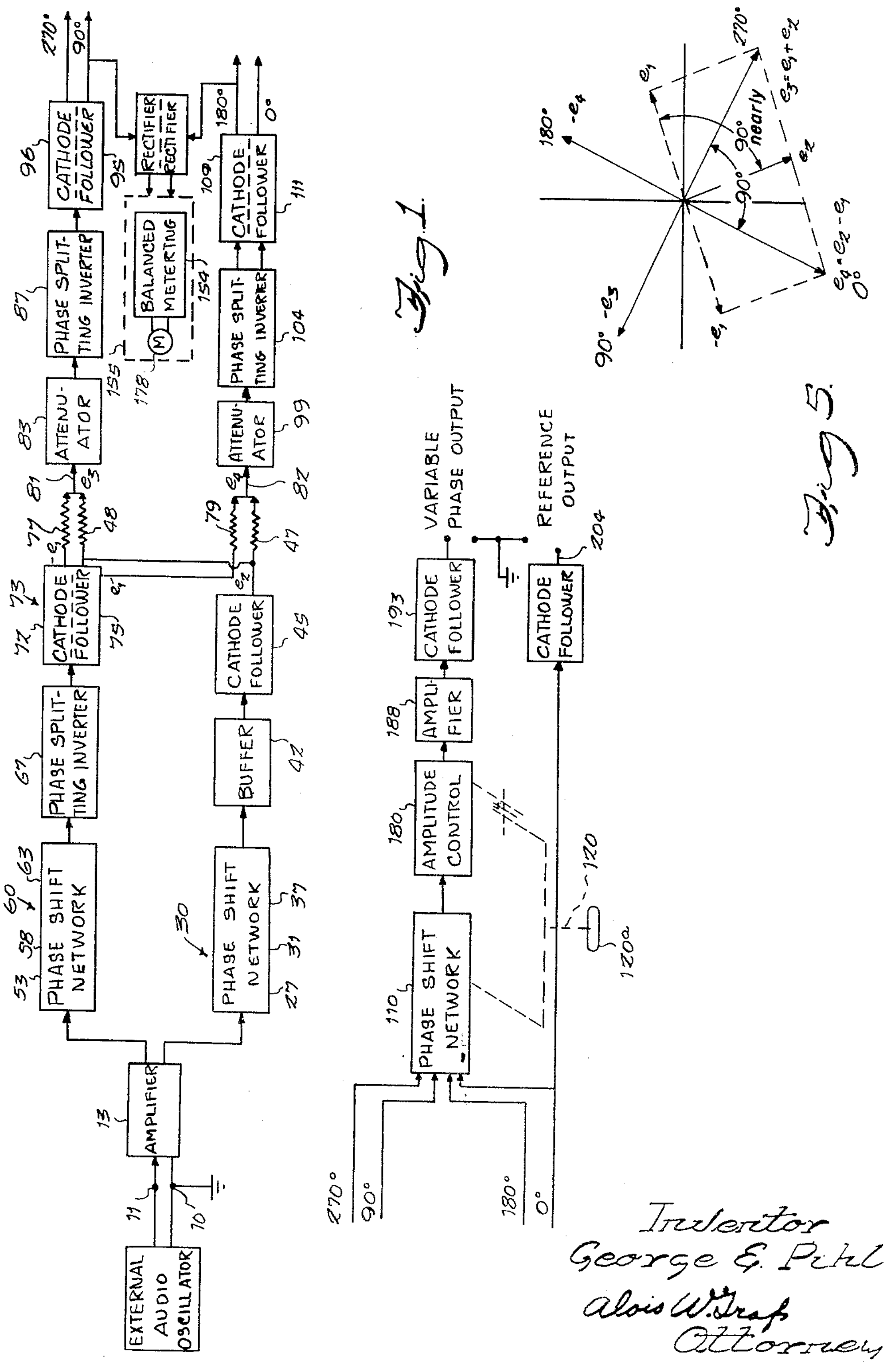
Figure 1 is a block diagram of the broad band phase standard of this invention.
Figure 5 is a vectorial voltage diagram showing the relationship of the voltages used to obtain the four-phase system for application to the phase shift network.

Turning now for the operation of the phase standard to Figure 1, it will be assumed that the vacuum tube voltmeter consisting of stage 155 and meter 178, has been balanced and zeroed as previously described. An externally supplied audio signal is next applied to terminals 10 and 11. The signal is amplified in amplifier stage 13. A fixed output signal is fed from amplifier stage 13 to a phase shift network 30 consisting of three tube stages 27, 31 and 37. The output of the phase shift network 30 is applied through a buffer stage 42 and a cathode follower stage 45 to a summing resistor 47 and a summing resistor 48. The phase shifted voltage applied to the summing resistors 47 and 48 will hereafter be referred to as $e_2$. The variable output from amplifier stage 13 is taken from the potentiometer 25 to the phase shift network 60 consisting of three tube stages 53, 58 and 63. The output of the phase shift network 60 is applied to the phase splitting inverter 67, which provides two 180° displaced output voltages. These voltages are applied to the input of the respective cathode follower stages 72 and 75. The output of the cathode follower stage 75, hereafter referred to as $-e_1$, is applied to a summing resistor 79. The summing resistors 47 and 79 cooperate to produce the sum $e_4$ of the two voltages $e_2$ and $-e_1$. The voltage $e_2$ is also applied to a summing resistor 48, which cooperates with the summing resistor 77 to provide an output voltage $e_3$ which is the sum of the two voltages $e_1$ and $e_2$.

Referring now to Figure 5, it is seen that the voltages $e_1$ and $e_2$ are displaced nearly 90° (may vary between 75° to 105°) in phase from each other. This is due to the fact that the phase shift networks 30 and 60 comprise a phase-difference network as described by R. B. Dome in "Electronics" for December 1946, page 112. This phase angle will remain large, i. e. nearly 90°, over a wide frequency range by the proper adjustment of the resistors 57, 62 and 66 in the tube stages 53, 58 and 63, respectively, of the phase shift network 60, and the proper adjustment of the variable resistors 32, 35 and 39 in the tube stages 27, 31 and 37, respectively, of the phase shift network 30. The amplitudes of voltages $e_1$ and $e_2$ are adjusted to be equal by adjusting the output amplitude of the voltage taken from the potentiometer 25 of the amplifier stage 13 to the phase shift network 60. The vectorial addition performed by the summing resistors 47, 79, 48 and 88 is clearly shown in Figure 5. By taking the sum and difference of voltages of equal magnitude and only approximately 90° apart ($e_1$ and $e_2$), a pair of voltages are derived which are exactly 90° apart but of different amplitudes ($e_3$ and $e_4$). It should be noted that the vector voltage $e_4$ has been arbitrarily designated as the zero degree reference phase, and thus defines the phase angle designation of all other vector voltages, placing vector voltage $e_3$ at 270° with respect to $e_4$. The voltage $e_3$ is applied to the attenuator stage 83, while the voltage $e_4$ is applied to the attenuator stage 99.

The output taken from the potentiometer 84 of the attenuator stage 83 and the output taken from the potentiometer 101 of the attenuator stage 99 have their respective potentiometer pickup arms 85 and 102 coupled to turn in opposite directions by a shaft 90, and thus will have their respective outputs varied inversely as the shaft 90, common to the two potentiometers, is rotated. The shaft 90 is rotated to provide a zero meter indication on the meter 178 in the cathode circuit of the balanced metering stage 155. The output of the attenuator stage 83 is applied to the phase splitting inverter 87. The two output voltages of the phase splitting inverter stage 87 are 180° displaced from each other. With respect to the zero degree reference phase $e_4$, they are positioned at 270° and 90°, respectively. The 270° and the 90° outputs of the phase splitting inverter stage 87 are applied to the cathode follower stages 96 and 95, respectively.

Figure 3:
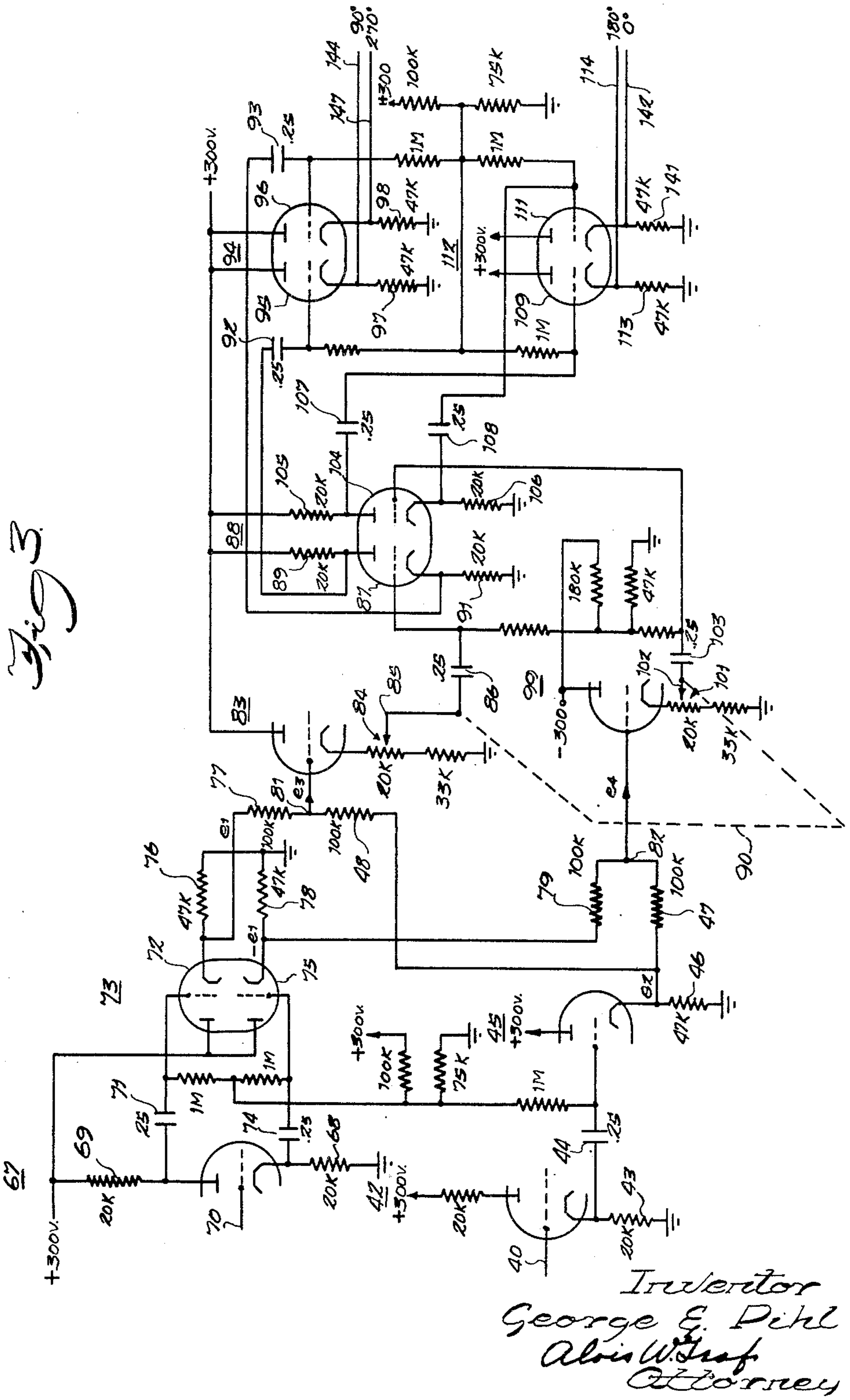
Figure 3 is a schematic wiring diagram of the portion of the broad band phase standard adjacent to that shown in Figure 2.
Figure 4:
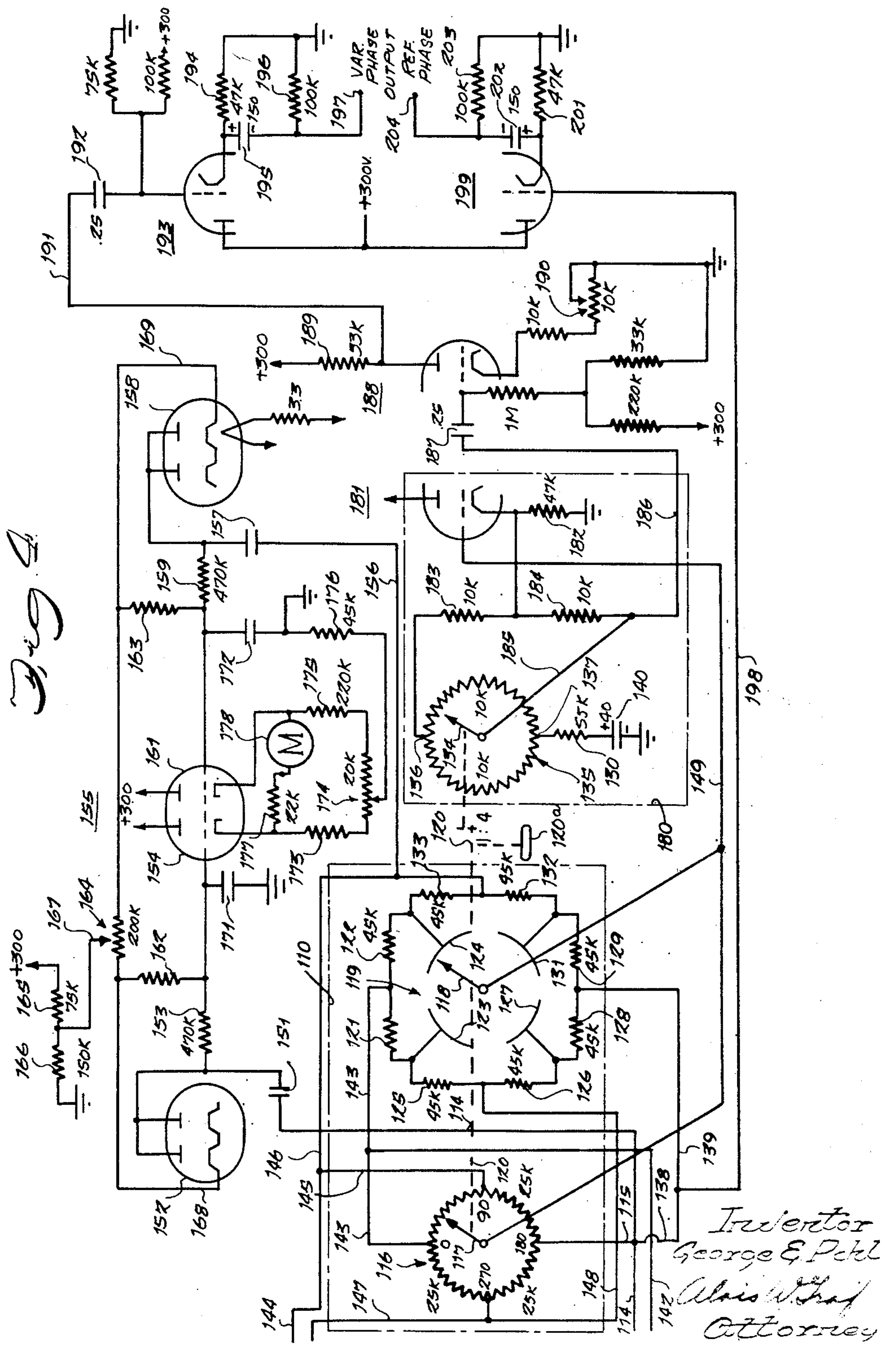
Figure 4 is a schematic wiring diagram of the portion of the broad band phase standard closest to the output terminals of the phase standard.

The output of the attenuator stage 99 is applied to a phase splitting inverter 104, having two output voltages whose phase relationship with respect to the 0° reference phase $e_4$ are 180° and 0°, respectively. These two outputs of the phase splitting inverter stage 104 are applied to respective cathode follower stages 109 and 111. The outputs of the cathode follower stages 95, 96, 109 and 111 are applied to a resistive phase shift network 110 having a linear relationship between the phase shift effected by the network and the rotation of the phase shift varying dial knob 120a. The resistor phase shift network consists of the potentiometer 116 and the four-section switch element 119, together with its resistor pairs 121—122, 125—126, 128—129 and 132—133 as discussed above (see Figure 3).

The phase variable output is applied to an amplitude control circuit 180 consisting of the cathode follower stage 181 which, in conjunction with the potentiometer 135 in its cathode circuit, serves to maintain the amplitude of the phase variable signal a constant. This amplitude control function of the cathode follower stage 181 is accomplished automatically by having the shaft 134 of the potentiometer 135 connected to rotate with and at four times the speed of the phase varying output arms 117 and 118 of the resistive phase shift network. Mechanically this is effected by having the previously mentioned shaft 120 common to the wiper arms 117, 118 geared at a 1:4 ratio to the wiper arm 134. The output of the amplitude control circuit 180 is applied to the amplifier stage 188, whose output is in turn applied to the cathode follower stage 193 which provides the phase variable output of the standard.

The reference phase is taken from the output of the cathode follower stage 109 through a cathode follower stage 199 to the output terminal 204, which provides the reference phase output of the standard. It should be noted that an additional 180° phase shift in the variable phase output, due to the amplifier stage 188, is compensated for by taking the reference phase output from the cathode follower stage 109 which provides the 180° phase voltage to the phase shift network 110. Thus, both outputs of the standard are shifted 180° from $e_4$, but the net phase shift between them is zero.

As is apparent, the frequency of the output voltage is determined by the frequency of the external audio oscillator. It is thus possible, by varying the frequency of the external audio oscillator and thereafter making the adjustments just described which may, in the normal case, be limited to adjusting the attentuator shaft 90 for zero reading on the meter 178, to use this device as a phase standard for any selected audio frequency.

This broad band or wide frequency capability provides the desirable versatility and flexibility of the device. It should be noted that by appropriate changes in circuit components and layout, the frequency range of this phase standard may be extended to other than audio frequencies.

While there has been shown and described an invention in connection with certain specific embodiments, it will, of course, be understood that it is not intended nor desired to be limited thereto, since it is apparent that the principles herein disclosed are susceptible of numerous other applications, and modifications may be made in the circuit arrangement and in the instrumentalities employed without departing from the spirit and scope of this invention as set forth in the appended claims.

I claim as my invention:

1. A broad band phase standard comprising a first and second phase shift network, means for supplying an oscillating voltage to said first and second phase shift networks, means including a summing network for combining the outputs of said first and second phase shift networks to obtain at least two voltages having a quadrature phase relationship, said quadrature voltages being fed to the inputs of a resistive phase shift network, said resistive phase shift network providing a variable phase voltage over the quadrant phase range between said quadrature voltages at its output.

2. A broad band phase standard according to claim 1 including amplitude control means for modifying said resistive phase shift network output voltage so as to cause it to have a substantially constant amplitude over the operating range of said standard.

3. A broad band phase standard according to claim 1 in which means are connected to said resistive phase shift network for maintaining said variable phase output voltage at a substantially constant amplitude, and means for maintaining said variable phase output voltage at substantially the same amplitude as the voltages of said input oscillations.

4. A broad band phase standard comprising a first and second phase shift network, means for supply an oscillating voltage to said first and second phase shift networks, means for combining the outputs of said first and second phase shift networks to obtain at least two voltages having a fixed phase relationship, said two voltages being fed to the inputs of a resistive phase shift network, said resistive phase shift network providing at its output a voltage variable in phase with respect to said two voltages.

5. A broad band phase standard according to claim 4 including amplitude control means for modifying said resistive phase shift network output voltage so as to cause it to have a substantially constant amplitude over the operating range of said standard.

6. A broad band phase standard according to claim 4 in which means are connected to said resistive phase shift network for maintaining said variable phase output voltage at a substantially constant amplitude, and means for maintaining said variable phase output voltage at substantially the same amplitude as the voltages of said input oscillations.

7. A broad band phase standard comprising a first and second phase shift network, means for supplying an oscillating voltage to said first and second phase shift networks, means for combining the outputs of said first and second phase shift networks to obtain a plurality of phase-displaced voltages and a reference voltage, said phase-displaced voltages and said reference voltage being fed to the inputs of a phase shift network, said phase standard providing at its output said reference voltage and a voltage from said phase shift network variable in phase with respect to said reference voltage.

8. A broad band phase standard according to claim 7 including amplitude control means for modifying said resistive phase shift network output voltage so as to cause it to have a substantially constant amplitude over the operating range of said standard.

9. A broad band phase standard according to claim 7 in which means are connected to said resistive phase shift network for maintaining said variable phase output voltage at a substantially constant amplitude, and means for maintaining said variable phase output voltage at substantially the same amplitude as the voltages of said input oscillations.

10. A broad band phase standard according to claim 7 having control means for maintaining said variable phase output voltage and said reference output voltage at substantially the same amplitude.

11. A broad band phase standard comprising a first and second phase shift network, means for supplying an oscillating voltage to said first and second phase shift networks, means for combining the outputs of said first and second phase shift networks to obtain a plurality of phase-displaced voltages and a reference voltage, said phase-displaced voltage and said reference voltage being fed to the inputs of a resistive phase shift network, means connected to said resistive phase shift network for maintaining said variable phase output voltage at a substantially constant amplitude, first buffer means connecting said variable phase output voltage to a first output of said standard, a second buffer means connecting said reference voltage to a second output of said standard, means for maintaining said variable phase output voltage of said standard at substantially the same amplitude as said first oscillating voltage, and means for adjusting said variable phase output voltage of said standard to have substantially the same amplitude as said reference output voltage of said standard.

12. A broad band phase standard comprising input terminals for connection to a source of oscillations, a first and second phase shift network connected to said input terminals, means for combining the inputs of said first and second phase shift networks to obtain four quadrature voltages, said quadrature voltages being fed to the inputs of a resistive phase shift network, said resistive phase shift network providing a variable phase voltage at its output, and amplitude control means for modifying said resistive phase shift network output voltage so as to cause it to have a substantially constant amplitude over the operating range of said standard.

13. A broad band phase standard comprising input terminals for connection to a source of oscillations, a first and a second phase shift network connected to said input terminals, means for combining the outputs of said phase shift networks to obtain four quadrature voltages, a resistive phase shift network for receiving said quadrature voltages to provide a variable phase voltage at its output, means connected to said resistive phase shift network for maintaining said variable phase output voltage at a substantially constant amplitude, and means for maintaining said variable phase output voltage at substantially the same amplitude as the voltages of said input oscillations.

References Cited in the file of this patent

UNITED STATES PATENTS 2,085,940 Armstrong -------------- July 6, 1937